United States Patent
Graceffo et al.

(10) Patent No.: US 11,159,244 B2
(45) Date of Patent: Oct. 26, 2021

(54) METHODS AND APPARATUS FOR FREQUENCY SHIFT KEYING FOR OPTICAL COMMUNICATION

(71) Applicant: RAYTHEON COMPANY, Waltham, MA (US)

(72) Inventors: Gary M. Graceffo, Burke, VA (US); Andrew Kowalevicz, Arlington, VA (US)

(73) Assignee: RAYIHEON COMPANY, Waltham, MA (US)

( * ) Notice: Subject to any disclaimer, the term of this patent is extended or adjusted under 35 U.S.C. 154(b) by 0 days.

(21) Appl. No.: 17/027,177

(22) Filed: Sep. 21, 2020

(65) Prior Publication Data

US 2021/0105073 A1    Apr. 8, 2021

Related U.S. Application Data

(60) Provisional application No. 62/903,023, filed on Sep. 20, 2019.

(51) Int. Cl.
*H04B 10/61* (2013.01)

(52) U.S. Cl.
CPC ................ *H04B 10/612* (2013.01)

(58) Field of Classification Search
None
See application file for complete search history.

(56) References Cited

U.S. PATENT DOCUMENTS

| | | | |
|---|---|---|---|
| 2017/0098921 A1* | 4/2017 | Takabayashi | H01S 5/4025 |
| 2017/0126260 A1* | 5/2017 | Torbatian | H04L 7/0075 |
| 2017/0214472 A1* | 7/2017 | Caplan | H04B 10/67 |
| 2017/0373752 A1* | 12/2017 | Rains | H04B 10/116 |

* cited by examiner

*Primary Examiner* — David W Lambert
(74) *Attorney, Agent, or Firm* — Lando & Anastasi, LLP

(57) ABSTRACT

An optical communications receiver and a process for decoding an FSK modulated optical signal are disclosed. The receiver and process are configured to receive the FSK modulated optical input signal and to produce an electrical output signal having characteristics representative of FSK modulation of the FSK modulated input signal, and to process the electrical output signal to produce a decoded information signal.

20 Claims, 4 Drawing Sheets

METHODS AND APPARATUS FOR FREQUENCY SHIFT KEYING FOR OPTICAL COMMUNICATION

CROSS REFERENCE TO RELATED APPLICATIONS

This application claims priority under 35 USC § 119(e) to U.S. Provisional Patent Application Ser. No. 62/903,023, titled "METHODS AND APPARATUS FOR FREQUENCY SHIFT KEYING FOR OPTICAL COMMUNICATION," filed Sep. 20, 2019, which is incorporated by reference herein in its entirety for all purposes.

BACKGROUND

On-Off-Keying (OOK) is a common modulation scheme used for Free Space Optical (FSO) communications. An alternative method to OOK is Frequency shift Keying (FSK). FSK while technically feasible, is generally not used for FSO. This maybe because there is a processing penalty that such systems encounter. The signal must be split N times before processing, where "N" is the number of individual frequencies used. For example, if N=2 then there is a 3 dB loss and if N=4, there is a 6 dB loss, etc.

SUMMARY OF INVENTION

Aspects and embodiments are directed to a method of using and processing Frequency Shift Keying (FSK) without the described processing penalty. Certain aspects and embodiments eliminate the need for splitting the incoming signal into N light paths. Certain aspects and embodiments take advantage of anti-resonant reflections from anti-resonant filters. Certain aspects and embodiments use anti-resonant reflections to route at least one wavelength signal to either a detector or to an additional anti-resonant filter (for systems using more than two wavelengths).

According to one embodiment, an optical communications receiver comprises an FSK receiver coupled to an input that is configured to receive an FSK modulated optical input signal and to produce an electrical output signal having characteristics representative of FSK modulation of the FSK modulated input signal.

In one example, the communications receiver further comprises signal processing circuitry configured to receive and process the electrical output signal to produce a decoded information signal.

In one example, further comprises a combiner that combines the recovered bits from the multiple detectors back into the original bit stream.

In one example, the electrical output signal has bit information that correspond to the FSK modulation of the phase modulated optical input signal.

In one example, FSK receiver does not require splitting of the FSK modulated input signal into multiple paths.

In one example, FSK receiver includes an anti-resonant filter and the resonant signal is provided to a first detector. In one example, the anti-resonant signal reflected from the anti-resonant filter is provided to a second detector. In one example, the anti-resonant signal reflected from the anti-resonant filter is provided to a second anti-resonant filter.

In one example, the anti-resonant filter comprises an etalon that is used to separate the wavelengths.

In one example, the FSK modulated optical signal comprises at least two wavelengths and one bit per symbol.

In one example, the FSK modulated optical signal comprises at least two wavelengths and comprises two bits per symbol using a combination of two wavelengths simultaneously.

In one example, the FSK modulated optical signal comprises at least three wavelengths and comprises multiple bits per symbol.

In one example, further comprises timing recovery for an all zero word in the symbol alphabet.

In one example, the FSK modulated optical signal further comprises a combination of any of phase shift keying, frequency shift keying and intensity modulation to increase the number of bits per symbol.

According to one embodiment, a process for decoding an FSK modulated optical signal, comprises receiving an FSK modulated optical signal, providing an electrical output signal having characteristics representative of FSK modulation of the FSK modulated optical signal, and processing the electrical output signal to produce a decoded information signal.

In one example, the providing the electrical output signal includes providing the electrical output signal with bit information that correspond to the FSK modulation of the phase modulated optical input signal.

In one example, the process does not require splitting of the FSK modulated input signal into multiple paths.

In one example, the FSK modulated optical signal comprises at least two wavelengths and one bit per symbol.

In one example, the FSK modulated optical signal comprises at least two wavelengths and comprises two bits per symbol using a combination of two wavelengths simultaneously.

In one example, the FSK modulated optical signal comprises at least three wavelengths and comprises multiple bits per symbol.

In one example, the process further comprises timing recovery for an all zero word in the symbol alphabet.

In one example, the process further comprises combining any of phase shift keying, frequency shift keying and intensity modulation to increase the number of bits per symbol.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments and are incorporated in and constitute a part of this specification, but are not intended as a definition of the limits of the invention. In the figures, each identical or nearly identical component that is illustrated in various figures is represented by a like numeral.

For purposes of clarity, not every component may be labeled in every figure. In the figures.

DETAILED DESCRIPTION

It has been demonstrated that On-Off-Keying (OOK) is a common modulation scheme used for Free Space Optical (FSO) communications, but such method comes at a signal processing penalty. Aspects and embodiments are directed to a method of using and processing Frequency Shift Keying (FSK) without the described processing penalty. Certain aspects and embodiments eliminate the need for splitting the incoming signal into N light paths. Certain aspects and embodiments take advantage of anti-resonant reflections from anti-resonant filters. Certain aspects and embodiments use anti-resonant reflections to route at least one wavelength signal to either a detector or to an additional anti-resonant filter (for systems using more than two wavelengths).

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

One Bit Per Symbol Example

Figure 1:
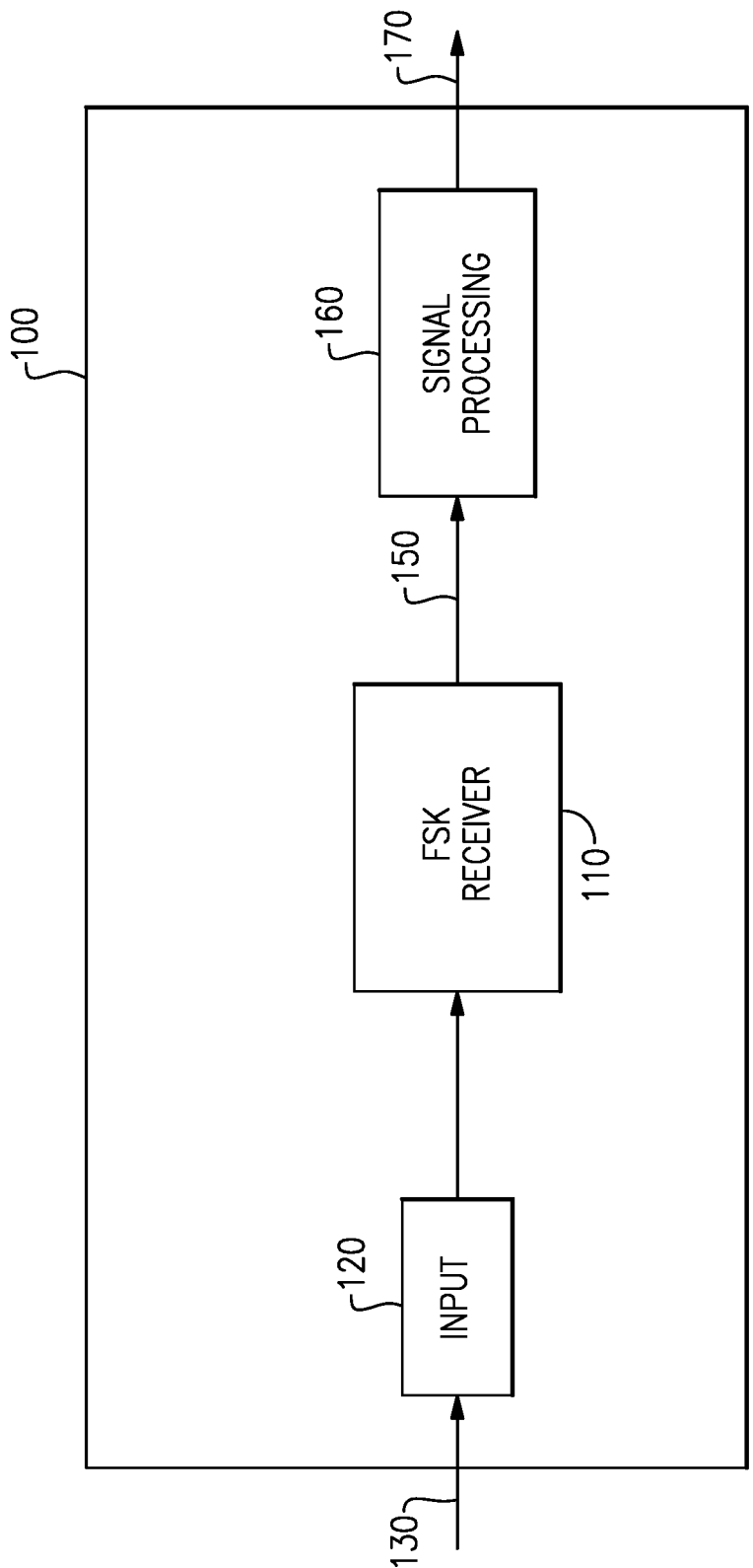
FIG. 1 is a block diagram of one example of an optical communications receiver according to aspects of the present invention.

Referring to FIG. 1, there is illustrated a block diagram of an example of an optical receiver 100 including an FSK receiver 110. The optical receiver 100 includes an input 120 that receives an incoming (input) FSK modulated signal 130. The input 120 may be any type of optical signal receiving or coupling mechanism, such as, but not limited to, an lens or telescope (for free space communications applications, for example) or other signal coupling device that receives the input signal 130 and allows the input signal 130 to be conveyed to other components of the receiver 100. The FSK receiver receives the FSK modulated input signal 130 and produces an output signal 150. The output signal 150 may have characteristics representative or indicative of the FSK modulation of the input signal 130, as discussed further below. The output signal 150 may be processed by signal processing circuitry 160 to produce a decoded information signal 170. The decoded information signal 170 may include the information that was encoded on the FSK modulated input signal 130 by the FSK modulation of the input signal 130. The signal processing circuitry 160 may include various components, as will be understood by those skilled in the art, such as analog-to-digital converters, filters, amplifiers, controllers, etc., to condition and process the electrical signals 150 received from the demodulator 140 to produce the decoded information signal 170.

Figure 2:
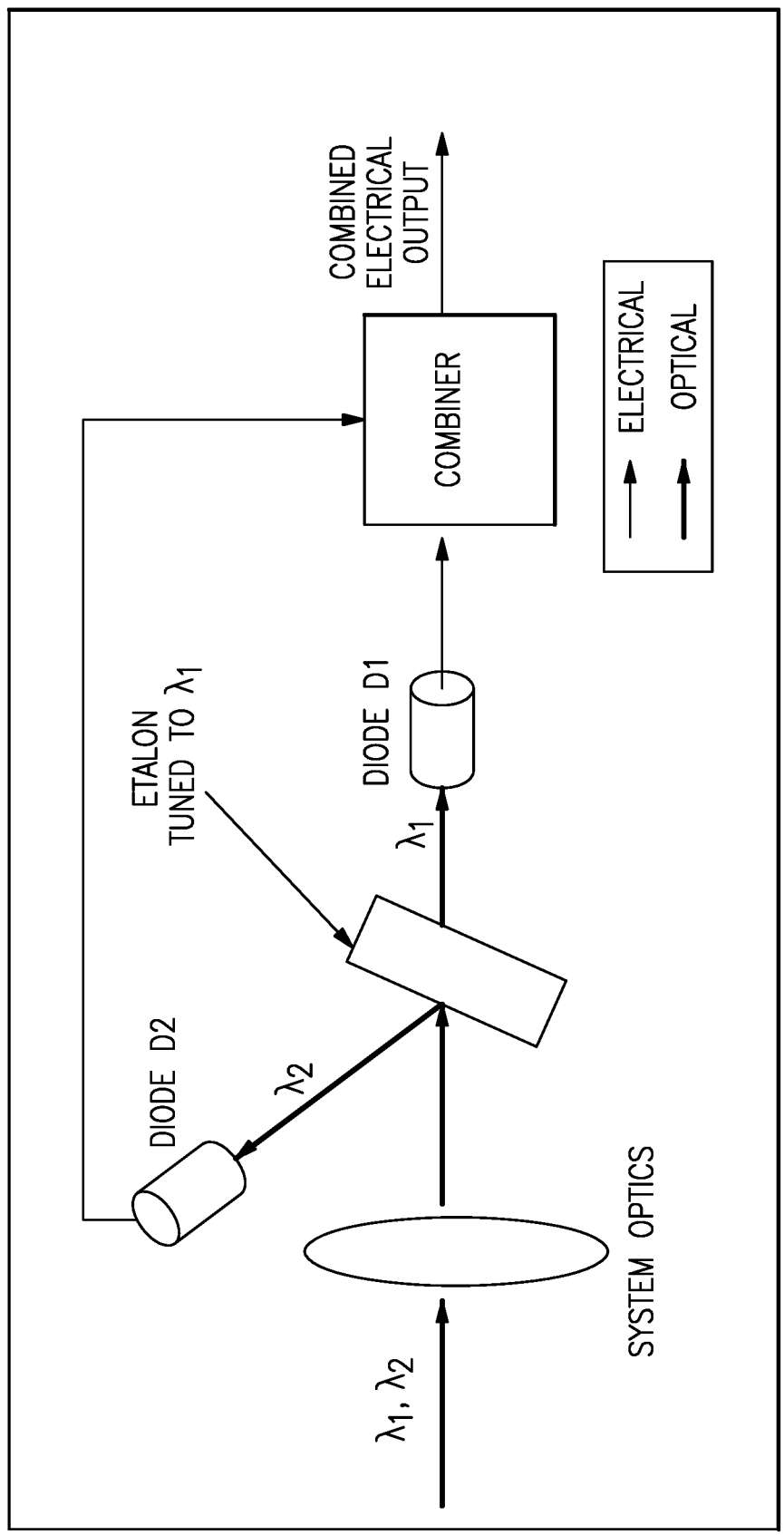
FIG. 2 is a block diagram of an FSK Optical Receiver that may be included in the communications receiver of FIG. 1.

The approach described herein eliminates the requirement for splitting the incoming light into N paths. Instead, advantage is taken of the anti-resonant back reflections that occur at the anti-resonant filters. The anti-resonant back reflections are used to route the anti-resonant signals to either a detector, for a system using two wavelengths or to another filter for systems using more than two wavelengths. One embodiment of a two-wavelength architecture is illustrated in FIG. 2, which works as follows: when a 'one' bit is to be transmitted, a signal at wavelength $\lambda_1$ is transmitted. The signal at wavelength $\lambda_1$ is resonant with an anti-resonant filter. One example of an anti-resonant filter is an etalon, but it is appreciated that any anti-resonant filter can be used. The etalon allows the signal at wavelength $\lambda_1$ to pass through the etalon and strike Detector diode D1. When a 'zero' is to be transmitted. A signal at wavelength $\lambda_2$ is transmitted. The signal at $\lambda_2$ is anti-resonant with the etalon and therefore is reflected from the etalon in the direction of Detector diode D2. The output signals from the photodetector diodes D1 and D2 (the ones and zeros) are then combined in a combiner to recreate the original bit sequence.

Figure 3:
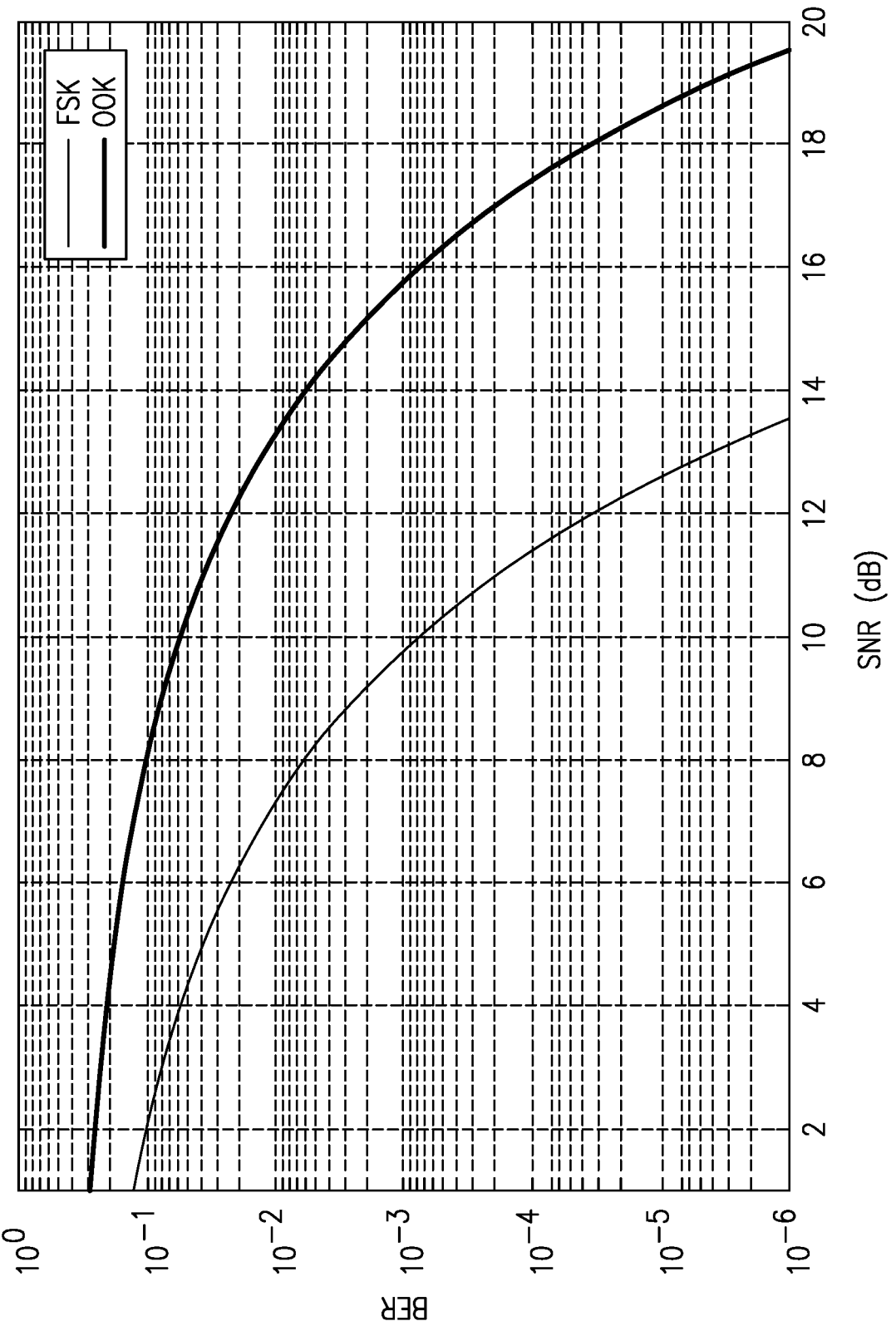
FIG. 3 illustrates Theoretical Bit Error Curves for FSK and OOK.

One advantage of using FSK modulation is that it has a 3 dB sensitivity advantage over OOK modulation for the same power, data rate and bit error rate. Theoretical bit error rate curves for FSK and OOK are shown in FIG. 3. For a bit error rate of $10^{-6}$, the required SNR for OOK and FSK are 19.8 dB and 16.8 dB respectively.

Figure 4B:
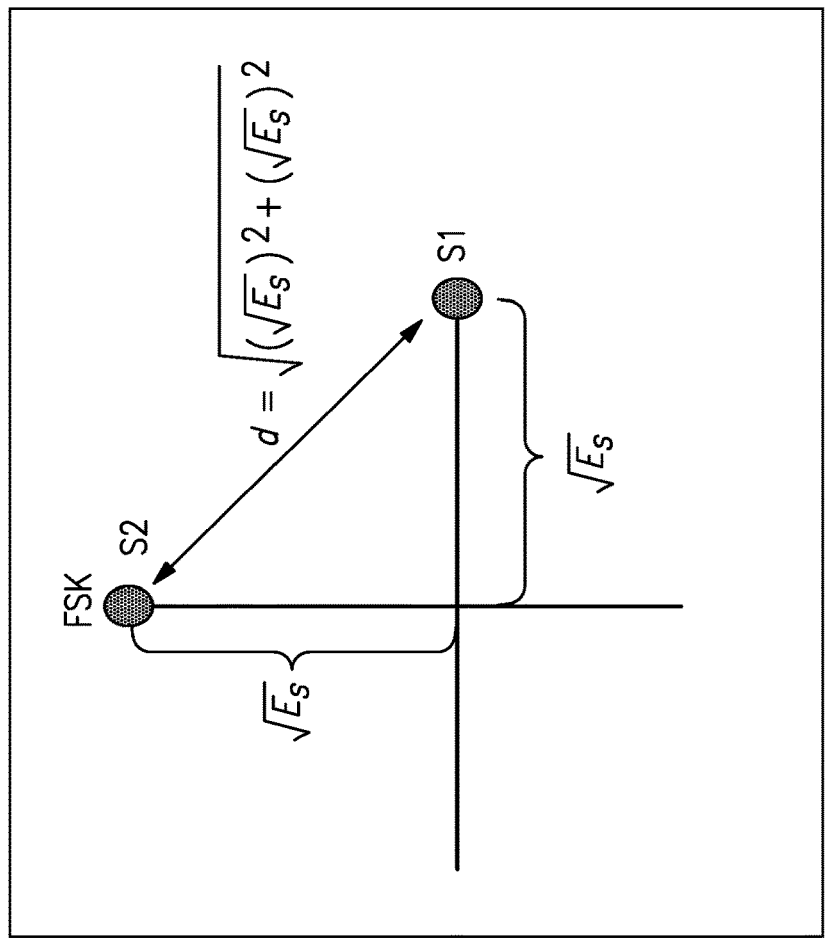
FIG. 4B illustrates an FSK Constellation graph.
Figure 4A:
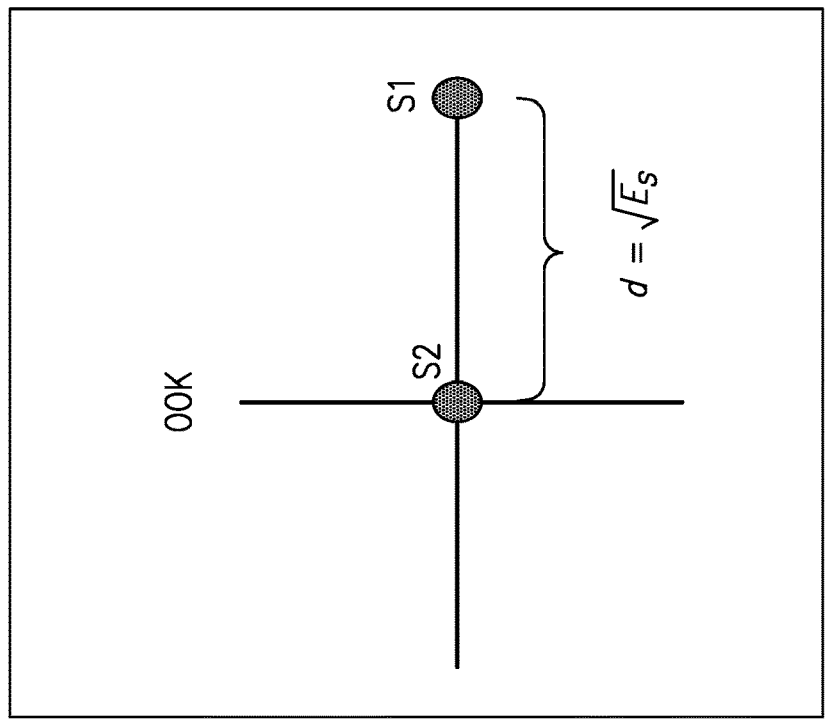
FIG. 4A illustrates an OOK Constellation graph.

One reason for the 3 dB improvement is due to the difference in symbol spacing in each of the constellations. FIG. 4(A) illustrates the OOK constellation and FIG. 4(B) illustrates the FSK constellation. The distance between the symbols is the length of the vector connecting the symbols. As the vector length increases, the probability of error decreases.

As can be seen in FIG. 4A, OOK is an antipodal or collinear constellation. No energy represents the $S_2$ symbol and maximum energy represents the $S_1$ symbol. Therefore, the vector length is $(E_s)^{0.5}$ As can be seen in FIG. 4B FSK is an orthogonal constellation. The distance between $S_1$ and $S_2$ is $(2*E_s)^{0.5}$. Where $E_s$ is the symbol energy. In power, the ratio of the two distances is 2 linear units or 3 dB. In summary, if all parameters are equal, FSK has a 3 dB sensitivity advantage compared to OOK.

Two Bits Per Symbol Example

The technique as described thus far only transmits one bit per symbol. However, two bits per symbol can be transmitted by using a combination of two wavelengths simultaneously. An added benefit to this approach is that the average power for two bits per symbol is the same as one bit per symbol using OOK for the same power, data rate and bit error rate.

In OOK systems, a laser transmits at full power for half a symbol period. In the FSK approach, lasers transmit at half power for the full bit period. The result is that the average normalized energy per bit is equal in both systems to ½. This is illustrated in Table 1.

Table 1 below shows the average normalized power for one bit per symbol, for either an OOK or FSK system. The first column is the bit sequence to be transmitted, the second and third columns are the normalized average powers transmitted by each laser. The fourth column is the total normalized power used to transmit each symbol. The last row is the average normalized power transmitted per symbol.

TABLE 1

One Bit per Symbol Average Normalized Power

| Bit Sequence | Laser 1 | Laser 2 | Total Normalized Average Pwr for Each Symbol |
|---|---|---|---|
| 0 | ½ | 0 | ½ |
| 1 | 0 | ½ | ½ |
| Average Normalized Pwr per Symbol | | | ½ |

Similar to Table 1, Table 2 below shows the average normalized power for two bits per symbol, for either an FSK or OOK system. The first column is the bit sequence to be transmitted, the second and third columns are the normalized average powers used by each laser. The fourth column is the total normalized power used to transmit each symbol. The last row is the average normalized power transmitted per symbol.

TABLE 2

Two Bits per Symbol Average Normalized Transmitted Power

| Bit Sequence | Laser 1 | Laser 2 | Total Normalized Average Pwr for Each Symbol |
|---|---|---|---|
| 00 | 0 | 0 | 0 |
| 01 | 0 | ½ | ½ |
| 10 | ½ | 0 | ½ |
| 11 | ½ | ½ | 1 |
| Average Normalized Pwr per Symbol | | | ½ |

By inspection, one can see that the average power per symbol for two bits vs one bit, remains the same.

Multiple Bits Per Symbol Example

This approach can be extended to include multiple bits per symbol. For example, using three wave lengths three bits per symbol can be generated. One possible implementation is shown in Table 3 below.

TABLE 3

Three Bits per Symbol using Three Wavelengths

| Bit Sequence | Lambda 1 | Lambda 2 | Lambda 3 |
|---|---|---|---|
| 000 | 0 | 0 | 0 |
| 001 | 0 | 0 | 1 |
| 010 | 0 | 1 | 0 |
| 011 | 0 | 1 | 1 |
| 100 | 1 | 0 | 0 |
| 101 | 1 | 0 | 1 |
| 110 | 1 | 1 | 0 |
| 111 | 1 | 1 | 1 |

Another approach to three bits per symbol is to use two wavelengths and the phase state of each wavelength.

It is appreciated that in wavelength, polarization and phase modulation can be used in combination with this approach. It is further appreciated that more than two bits per symbol will need timing recovery because the all zero state must be used.

In one example, the approach described herein uses an optical implementation of optical FSK modulation.

In one example, anti-resonant back reflections are used as a routing mechanism.

In one example, the optical signal is routed to another an additional anti-resonant filter using anti-resonant back reflection of a first anti-resonant filter.

In one example, the anti-resonant filter can be a cavity resonator or other device with an appropriate passband.

In one example, the anti-resonant filter can be an etalon.

In one example, the method allows for a combination of phase shift keying, frequency shift keying and intensity modulation to increase the number of bits per symbol.

In one example, an implementation of more than two bits per symbol is used with timing recovery if an all zero word is required in the symbol alphabet.

In one example, an optical cavity, such as an etalon, is used to simply and inexpensively separate the wavelengths.

In one example, a combiner is used to restructure the recovered bits from the multiple detectors back into the original bit stream.

It is appreciated that one advantage of the optical FSK approach described herein is that it eliminates the need to split the incoming optical signal. Another advantage, for one bit per symbol, is that optical FSK has a 3 dB advantage over OOK. Another advantage is that the method supports more than two frequencies. Another advantage is that Optical FSK provides spectral efficiency over conventional IM. Still another advantage is that this approach works for both fiber and FSO FSK.

Thus, aspects and embodiments provide an FSK modulator and/or receiver used in communications systems to modulate and demodulate FSK modulated optical signals.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An optical communications receiver comprising:
   an input to receive a frequency shift keying FSK modulated optical signal;
   an FSK receiver that is configured to receive the FSK modulated optical input signal and to produce an electrical output signal having characteristics representative of FSK modulation of the FSK modulated input signal, wherein the FSK receiver includes an anti-resonant filter configured to provide a resonant signal at an output of the anti-resonant filter and an anti-resonant reflected signal reflected from an input of the anti-resonant filter, and wherein the electrical output signal is based on both the resonant signal and the anti-resonant reflected signal; and
   signal processing circuitry configured to receive and process the electrical output signal to produce a decoded information signal.

2. The optical communications receiver of claim 1 wherein the electrical output signal has bit information that corresponds to the FSK modulation of the FSK modulated optical input signal.

3. The optical communications receiver of claim 1, wherein the FSK receiver does not require splitting of the FSK modulated input signal into multiple paths.

4. The optical communications receiver of claim 1, wherein the resonant signal is provided to a first detector.

5. The optical communications receiver of claim 4, wherein the anti-resonant signal is reflected from the anti-resonant filter and provided to a second detector.

6. The optical communications receiver of claim 4, wherein the anti-resonant signal is reflected from the anti-resonant filter and provided to a second anti-resonant filter.

7. The optical communications receiver of claim 4, wherein the anti-resonant filter comprises an etalon that is used to separate wavelengths of the FSK modulated optical input signal.

8. The optical communications receiver of claim 1, wherein the FSK modulated optical signal comprises at least two wavelengths and one bit per symbol.

9. The optical communications receiver of claim 1, wherein the FSK modulated optical signal comprises at least two wavelengths and comprises two bits per symbol using a combination of two wavelengths simultaneously.

10. The optical communications receiver of claim 1, wherein the FSK modulated optical signal comprises at least three wavelengths and comprises multiple bits per symbol.

11. The optical communications receiver of claim 10, further comprising timing recovery for an all zero word in a symbol alphabet.

12. The optical communications receiver of claim 1, wherein the FSK modulated optical signal further comprises a combination of any of phase shift keying, frequency shift keying and intensity modulation to increase a number of bits per symbol.

13. The optical communications receiver of claim 1, further comprising a combiner that combines recovered bits from multiple detectors back into an original bit stream.

14. A process for decoding a frequency shift keying (FSK) modulated optical signal, comprising:
   receiving the FSK modulated optical signal at an input of an anti-resonant filter;
   providing a resonant signal at an output of the anti-resonant filter;
   providing an anti-resonant reflected signal reflected from the input of the anti-resonant filter;
   providing an electrical output signal having characteristics representative of FSK modulation of the FSK modulated optical signal, the electrical output signal based on both the resonant signal and the anti-resonant reflected signal; and
   processing the electrical output signal to produce a decoded information signal.

15. The process as claimed in claim 14, wherein providing the electrical output signal includes providing the electrical output signal with bit information that corresponds to the FSK modulation of the FSK modulated optical signal.

16. The process as claimed in claim 14, wherein the process does not require splitting of the FSK modulated signal into multiple paths.

17. The process as claimed in claim 14, wherein the FSK modulated optical signal comprises at least two wavelengths and one bit per symbol.

18. The process as claimed in claim 14, wherein the FSK modulated optical signal comprises at least two wavelengths and comprises two bits per symbol using a combination of two wavelengths simultaneously.

19. The process as claimed in claim 14, wherein the FSK modulated optical signal comprises at least three wavelengths and comprises multiple bits per symbol.

20. The process as claimed in claim 14, further comprising timing recovery for an all zero word in a symbol alphabet.

* * * * *